J. STEPHENSON.

Car Axle-Box.

No. 8,084. Reissued Feb. 19, 1878.

*Witnesses:*

D. G. Fruard

A. McCallum

*Inventor.*

John Stephenson per P. Hannay

Atty.

N. PETERS, PHOTO-LITHOGRAPHER, WASHINGTON, D. C.

UNITED STATES PATENT OFFICE.

JOHN STEPHENSON, OF NEW YORK, N. Y.

IMPROVEMENT IN CAR-AXLE BOXES.

Specification forming part of Letters Patent No. 49,005, dated July 25, 1865; Reissue No. 8,084, dated February 19, 1878; application filed December 23, 1875.

DIVISION K[1].

*To all whom it may concern:*

Be it known that I, JOHN STEPHENSON, of New York, in the county of New York and State of New York, have invented certain new and useful Improvements in Car-Axle Boxes; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
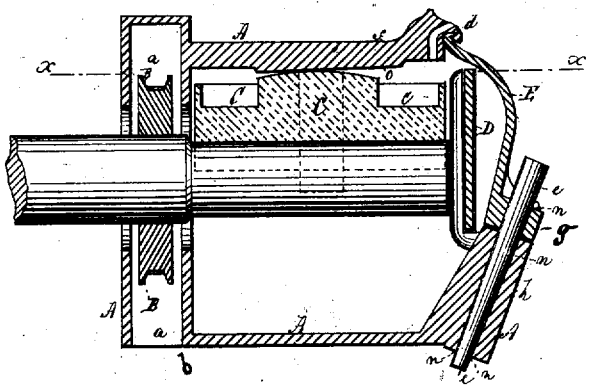
Figure 2:
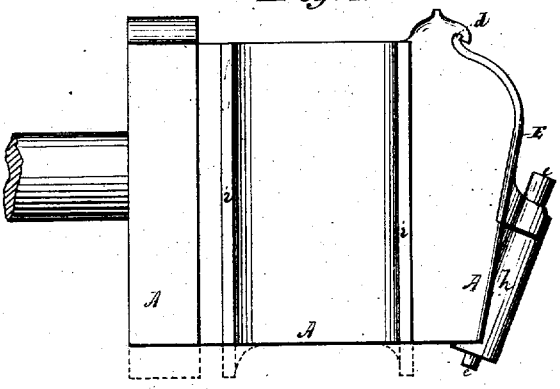
Figure 3:
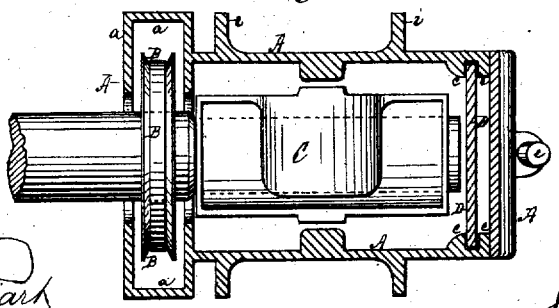

Figure 1 represents a vertical longitudinal section of an axle-box to which my invention has been applied, the axle being broken off; Fig. 2, a side elevation; and Fig. 3, a horizontal longitudinal section of the same, taken through line *x x* of Fig. 1.

The object of this branch of my invention is to provide a car-axle-box shell which shall be capable of making provision for several improvements in the internal arrangement and appendages of the box, as hereinafter more fully described, and pointed out in the claims.

To enable others skilled in the art to make, construct, and use my improvement, I will now describe its parts in detail.

A represents the improved shell, provided with a chamber, *a*, at its rear end, for the reception of the dust-collar B. This chamber *a* is provided with an opening, *b*, for the insertion of the dust-collar B, which I prefer to arrange at its bottom or under side.

In order to retain the self-adjusting brass or bearing C in place, and to allow it also to be readily removed from the shell for any reason whatever, provision must be made for the use of a movable wall or check-plate, D. This I effect by constructing the internal side walls of the shell, near the end of the axle-journal, and in a vertical plane slightly beyond the front end of the roof *f* of the box, with shoulders *c*, to form a groove, into or between which the check-plate or fourth wall D is placed, and that in such manner as to be easily removed at will.

In order to allow the brass or bearing C to adjust itself to the axle, the roof *f* of the box, on its under side, is provided with a longitudinal segmental or plane bearing-surface, formed by a projection, *o*, on the under side of the roof. This bearing-surface, while it allows the bearing to adjust itself to the axle, also serves to keep it firmly in place upon the axle. For the door E provision is made by forming a groove, *d*, at the front edge of the roof *f* of the box, which has its mouth or opening downward. Into this groove the upper edge of the box-door is forced, and, as it were, retained by securing its lower edge by a wedge-shaped bolt or pin, *e*, which is made to pass through an opening, *n*, in a flange or limb, *g*, on the lower edge of the door, and an opening or hole, *n'*, formed in the lower half of the thickened front end or outer wall *h* of the shell. The opening or hole *n* is made to run in a vertical, or approximately vertical, direction in the thickened lower half of the front end wall *h* of the shell.

The removal of the door E allows the withdrawal of the check-plate D and brass C, in a simple and expeditious manner.

With the view of increasing the friction or chafing surfaces of the pedestal-guides, the walls of the dust-chamber *a* are extended laterally beyond the sides of the axle-box proper, thus forming, in connection with the usual flanges *i i*, three or four chafing-guides at each side of the axle-box, instead of two, as heretofore.

Having described my invention, I claim as new and desire to secure by Letters Patent—

1. A car-axle-box shell provided with a groove, *d*, at the front verge of its roof *f*, for receiving the upper edge of the door, substantially as set forth.

2. A car-axle-box shell provided with a thickened front wall, *h*, in which is formed a hole, *n*, wholly external of the oil-chamber, for the reception of a screw-bolt or pin, *e*, to secure the door E in place, substantially as set forth.

3. A car-axle-box shell having a groove at the front verge of the roof for receiving the upper edge of the box-door, and having a hole approximately vertical in the front wall for the reception of the bolt or pin which secures the door, substantially as set forth.

4. A car-axle-box shell having a dust-chamber at its rear, provided with projecting walls, constructed and arranged to form additional chafing-surfaces for the pedestal jaws or guides, substantially as set forth.

5. A car-axle-box shell provided with a dust-chamber at its rear, and an opening therein for the admission of the dust-collar or packing, and internal grooves for holding the check-plate at the end of the axle, substantially as set forth.

6. A car-axle-box shell having a dust-chamber at its rear, and an opening therein for the admission of the dust-collar, the walls of said chamber being made to project to form chafing-surfaces for the pedestal jaws or guides, and the roof of the shell shortened to admit entrance and exit of check-plate, substantially as set forth.

7. A car-axle-box shell having the check-plate grooves, in combination with the shortened roof, whereby the check-plate can be put in position within the box or removed, at pleasure, substantially as set forth.

8. A car-axle-box shell provided with a shortened roof, the internal surface of which, in the line of its length, is made straight or plain or convexly curved, and the sides of the box provided with shoulders or grooves for the reception of a removable check-plate to secure the brass or bearing in place, substantially as set forth.

9. A car-axle-box shell having the ceiling a longitudinally segmental or plane surface, and the front verge of the roof with a groove for lodgment of the upper edge of the box-door, substantially as set forth.

10. A car-axle-box shell having a chamber at the rear for the dust-collar, grooves for lodgment of the check-plate, roof shortened for placing and removing the check-plate, and door overhanging the check-plate to retain it in position, substantially as set forth.

11. A car-axle box provided with a dust-collar chamber at its rear, shoulders or grooves at its front for the reception of a removable check-plate, and a shortened roof, substantially as set forth.

12. The combination of a car-axle the journal of which is unprovided with a collar or shoulder at its outer end with a removable brass and a car-axle box, having shoulders or grooves for the reception of a removable check-plate, and a shortened roof, the internal surface of which, in the line of its length, is made plain or straight, or convexly curved, in the manner and for the purpose substantially as set forth.

In testimony that I claim the foregoing I have hereunto set my hand this 7th day of December, 1875.

JOHN STEPHENSON.

Witnesses:

STUART A. STEPHENSON,
WILLIAM J. WALKER.